(12) United States Patent
Ueno et al.

(10) Patent No.: US 7,665,372 B2
(45) Date of Patent: Feb. 23, 2010

(54) ROLLING BEARING DEVICE WITH SENSOR AND STRAIN SENSOR

(75) Inventors: Hiroshi Ueno, Tondabayashi (JP); Shinichi Mizuta, Daitou (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 11/409,997

(22) Filed: Apr. 25, 2006

(65) Prior Publication Data
US 2006/0243068 A1  Nov. 2, 2006

(30) Foreign Application Priority Data

Apr. 27, 2005 (JP) ............................ P2005-129901
Jul. 27, 2005 (JP) ............................ P2005-216958

(51) Int. Cl.
*G01L 3/14* (2006.01)

(52) U.S. Cl. ................................. 73/862.322

(58) Field of Classification Search ............. 73/862.322
See application file for complete search history.

(56) References Cited

U.S. PATENT DOCUMENTS

| | | | | |
|---|---|---|---|---|
| 2,198,376 A | * | 4/1940 | Cederberg | .................. 384/564 |
| 4,112,751 A | * | 9/1978 | Grunbaum | ............. 73/862.632 |
| 4,322,707 A | * | 3/1982 | Ort | ................................ 338/2 |
| 5,140,849 A | * | 8/1992 | Fujita et al. | .................... 73/593 |
| 5,488,871 A | * | 2/1996 | Harbottle et al. | ......... 73/862.55 |
| 5,557,854 A | * | 9/1996 | Fujioka | ....................... 33/517 |
| 5,599,111 A | * | 2/1997 | Miyazaki et al. | ............ 384/512 |
| 6,135,643 A | * | 10/2000 | Hattori et al. | ............... 384/589 |
| 7,263,901 B2 | * | 9/2007 | Pecher et al. | ......... 73/862.045 |

FOREIGN PATENT DOCUMENTS

JP   2002-213438   7/2002

OTHER PUBLICATIONS

Machine Translation of JP 2002-213438, dated Jul. 31, 2002, supplied with the IDS submitted on Apr. 25, 2006.

* cited by examiner

*Primary Examiner*—Lisa M Caputo
*Assistant Examiner*—Octavia Davis
(74) *Attorney, Agent, or Firm*—Nixon & Vanderhye, PC

(57) ABSTRACT

In the rolling bearing device with a sensor in this invention, a band-shaped film 111 having insulation property is affixed to an outer circumferential surface of an outer ring 101 so as to extend in the circumferential direction. On the film 111 is affixed a foil 112 composed of identical four portions and having electrical conductivity which are placed at generally equal intervals in the circumferential direction of the outer ring 101. A resistance between a first place and a second place of the foil 112 is measured by a resistance measurement section of a microcomputer. A preload calculation section of the microcomputer, upon reception of an output from the resistance measurement section, calculates a preload of the outer ring 101 based on the measured resistance.

13 Claims, 12 Drawing Sheets

131

ROLLING BEARING DEVICE WITH SENSOR AND STRAIN SENSOR

This nonprovisional application claims priority under 35 U.S.C. §119(a) on Patent Application No(s). 2005-129901 filed in Japan on Apr. 27, 2005, and on Patent Application No(s). 2005-216958 filed in Japan on Jul. 27, 2005, the entire contents of which are hereby incorporated by reference.

BACKGROUND OF THE INVENTION

The present invention relates to a rolling bearing device with a sensor and relates to a strain sensor.

As a rolling bearing device with a sensor, there has conventionally been provided a double-row angular contact ball bearing device described in JP 2002-213438 A.

In this double-row angular contact ball bearing device, balls are placed between one of two-row raceway grooves formed in the inner circumferential surface of the outer ring and the raceway groove of the first inner ring, while balls are placed between the other of the two-row raceway grooves of the outer ring and the raceway groove of the second inner ring.

The first inner ring and the second inner ring are spaced from each other in an axial direction of the bearing device. In the outer circumference portion of the outer ring facing the portion between the first inner ring and the second inner ring, a groove having a generally trapezoidal cross section is formed so as to extend in the circumferential direction of the outer ring. A pressure sensor is placed at this groove. The lead wire of the pressure sensor is connected to a sensor output processing unit. The sensor output processing unit receives an output from the pressure sensor and, in a continuing series, measures a preload applied to the outer ring.

Based on an output of the sensor output processing unit, the conventional double-row angular contact ball bearing device described above adjusts the load applied to the outer ring so as to adjust the preload, which is applied to the outer ring to a proper value. The conventional double-row angular contact ball bearing device measures the preload after assembly of bearing component parts, thus having an advantage that there is no need for considering dimensional variation of each bearing component part.

However, the conventional double-row angular contact ball bearing device has a need for taking into consideration errors due to mounting accuracy of the pressure sensor. This poses a problem that adjustment of the instrumentation amplifier or the like is required based on the mounting accuracy of the pressure sensor.

Further, in the conventional double-row angular contact ball bearing device, since the sensor is a pressure sensor having a considerable thickness, it is necessary to deepen the depth of the groove in which the pressure sensor is to be housed. As a result, there is a problem that the cost for the formation of the groove is increased, resulting in a large mounting cost of the pressure sensor.

Moreover, since not only the pressure sensor described above but sensors for measurement of strain are conventionally high in cost for the sensors themselves, there is a problem that sensor-equipped rolling bearing devices with a sensor are high in manufacturing cost.

SUMMARY OF THE INVENTION

Accordingly, an object of the present invention is to provide a rolling bearing device with a sensor which allows an easy, low-cost and accurate setting of the preload that is applied to the rolling bearing. A further object of the invention is to provide a rolling bearing device with a sensor, as well as a strain sensor, which is high in measurement accuracy of the preload acting on the rolling bearing and which low in manufacturing cost.

In order to accomplish the above object, there is provided, a rolling bearing device with a sensor comprising:

an outer ring having a raceway surface on inner circumference thereof;

an inner ring having a raceway surface on outer circumference thereof;

rolling elements placed between the raceway surface of the outer ring and the raceway surface of the inner ring; and a sensor having a film which is to be affixed onto a surface of the outer ring or the inner ring and which has insulation property, a foil which is to be affixed onto the film and which has electrical conductivity, and a measurement section for measuring a current, voltage or resistance between a first place and a second place of the foil.

In this case, the term 'foil' refers to a thing formed by thinly stretching metal, for example, gold, silver, copper, tin or the like, which is a paper-like metal piece to be affixed to a surface of an object.

According to the present invention, since the rolling bearing device with a sensor have a film affixed onto a surface of the outer ring or the inner ring, a foil affixed onto the film, and a measurement section for measuring a current, voltage or resistance between a first place and a second place of the foil, by measuring a current, voltage or resistance between the first place and the second place of the foil by the measurement section, it is possible to measure any strain of the foil having correlation to that current, voltage, or resistance. Thus, it becomes possible to detect, based on the strain of the foil, a strain of the outer ring or the inner ring (stress acting on the outer ring or the inner ring) on which the foil is affixed, by which a preload imparted thereto can be measured.

Also according to the invention, since the portions of the sensor fitted to the bearing are made of uniform-in-thickness, extremely thin film and foil, the depth of the groove to the formed in the surface of the outer ring or the inner ring can be made greatly shallower than the conventional counterpart. And only affixing the film and foil to the shallow groove allows the preload imparted to the outer ring or the inner ring to be measured. Therefore, the preload can be measured with relatively low cost.

Furthermore, according to the invention, since the portions of the sensor fitted to the bearing are made of uniform-in-thickness, extremely thin and flexible film and foil, the sensor can be fitted even to a bent curved surface with ease. Also, after the fitting of the sensor to the bearing, the sensor can be prevented from thickness variations of its portions fitted to the bearing due to the configuration of the bearing portions at which the portions are fitted. Therefore, there occurs almost no errors in the fitting of the sensor, so that the level of preload measurement can be improved.

In one embodiment, the foil is meandering band-shaped.

In this embodiment, since the foil is formed into such a meandering hand shape that its electrical characteristics easily change due to strain, the strain of the outer ring or the inner ring as well as the preload acting on the outer ring or the inner ring can be measured with accuracy.

In one embodiment, the film is affixed to an outer circumferential surface of the outer ring;

the foil is composed of a plurality of portions which are identical in configuration and which are placed on an outer circumference of the outer ring at generally equal intervals in a circumferential direction of the outer ring.

In this embodiment, since the foil is composed of a plurality of portions which are identical in configuration and which are placed on the outer circumference of the outer ring at generally equal intervals in a circumferential direction of the outer ring, not local strain of the outer ring but average strain of the whole outer ring can be measured.

In one embodiment, material of the film is a polyimide-based material and material of the foil is nichrome.

In this embodiment, since material of the film is a polyimide-based material, there can be formed a thin, highly insulative film. Also, since material of the foil is nichrome, there can be formed a foil which is thin and which allows a change in current, voltage or voltage to be easily detected in response to a strain.

In one embodiment, further comprising a preload calculation section for calculating a preload which is imparted to the outer ring or the inner ring based on an output from the measurement section.

In this embodiment, comprising a preload calculation section for calculating, based on an output from the measurement section, a preload which is imparted to the outer ring or the inner ring, the preload imparted to the outer ring or the inner ring can be calculated.

Furthermore, in the present invention, there is provided, A rolling bearing device with a sensor comprising:

an outer ring having a raceway surface on an inner circumference side thereof;

an inner ring having a raceway surface on an outer circumference side thereof;

rolling elements interposed between the raceway surface of the outer ring and the raceway surface of the inner ring; and a strain sensor mountable on a surface of the outer ring or the inner ring, the strain sensor having a conductive interconnection line having a plurality of thin-line shaped high-resistance portions made of metal thin film on a way of a route thereof and being formed on an insulative film.

According to the invention, fitting the strain sensor to the surface of the inner ring or the outer ring allows a plurality of high-resistance portions to be placed at a plurality of places of the race surface. Therefore, it is no longer necessary to do such troublesome work as preparing a plurality of commercially available strain gauges and affixing these gauges one by one to the race surface. Besides, it becomes possible to reduce the cost for the strain sensor in comparison with cases where a plurality of commercially available strain gauges are used. Also, since the high-resistance portions are placed at a plurality of positions, a preload can be calculated by measuring deformation not only of one place but of a plurality of places. Therefore, the preload that acts on the race can be decided from data derived from a plurality of places, so that the measurement accuracy for preloads can be enhanced.

In one embodiment, the high-resistance portions are disposed in a situation each longitudinal position for the strain sensor is different, and the strain sensor is placed on a circumferential surface of the outer ring or the inner ring so that a longitudinal direction of the strain sensor is generally coincident with a circumferential direction of the circumferential surface.

In this embodiment, only by setting the strain sensor so that the longitudinal direction of the strain sensor becomes generally coincident (in a winding fashion) with the circumferential direction of the race surface, the high-resistance portions serving as strain gauges can be placed at a plurality of circumferential positions on the circumferential surface. Therefore, the preload that acts on the whole race can be decided comprehensively, so that the measurement accuracy for preloads can be even more enhanced.

In one embodiment, the strain sensor has a band-shaped portion formed into a generally band shape, and a lead-out portion extending along a direction generally perpendicular to a longitudinal direction of the band-shaped portion, wherein the circumferential surface has a circumferential groove formed along the circumferential direction and a take-out groove being formed in continuation to the circumferential groove and extending from the circumferential groove to a bearing end face, and the band-shaped portion is placed within the circumferential groove, and the lead-out portion reaches an bearing outside via the take-out groove.

In this embodiment, by virtue of the presence of the circumferential groove and the take-out groove, the strain sensor can be set without being pinched by a circumferential surface of the race and an external member fitted thereto or the like. Also, since the lead-out portion reaches the bearing outside, the strain sensor and external equipment can be easily connected to each other by the lead-out portion.

In one embodiment, the high-resistance portions are placed circumferentially at generally equal intervals.

In this embodiment, since deformation data as to the race at generally equal intervals in the circumferential direction are obtained, the preload that acts on the whole race can be grasped more accurately.

Furthermore, in the present invention, there is provided, a strain sensor including an insulative film formed into a generally band shape, and an electrically conductive interconnection line formed on the insulative film, wherein the conductive interconnection line has a plurality of thin-line shaped high-resistance portions on a way of a route thereof, and the plurality of high-resistance portions are placed at a plurality of positions in a longitudinal direction of the insulative film.

According to the invention, only fitting the single strain sensor to an object surface makes it possible to measure strain (deformation) at a plurality of places with ease. Therefore, it is no longer necessary to do such troublesome work as affixing a plurality of strain gauges to a surface of a test object. Then, setting the sensor so that the longitudinal direction of the insulative film becomes generally coincident with the circumferential direction of the race makes it possible to easily measure strain at a plurality of circumferential places of the race. Further, a strain sensor is made up that the plural high-resistance portions formed of metal thin film are provided on the indicator film, the cost for the strain sensors can be reduced in comparison with cases where a plurality of commercially available strain gauges are used.

In one embodiment, the insulative film has an intermediate portion extending along longitudinal direction thereof, and both end portions extending in one direction generally perpendicular to the longitudinal direction from both ends of the intermediate portion, and both a plurality of the high-resistance portions and connecting portions that connect the high-resistance portions to one another are formed of one band-shaped metal thin film and are placed along a direction in which the insulative film extends.

In this embodiment, by setting the sensor so that the longitudinal length of the strain sensor is generally equal to the circumferential length of the circumferential surface of the race, two end portions of the sensor can be made proximate to each other in a state that the sensor is wounded around the circumferential surface of the race. This greatly facilitates the connection between conductive interconnection line and external equipment. Also, not only the high-resistance portions but also the connecting portions of the conductive interconnection line are each formed of a metal thin film, the connecting portions become thinner, so that the sensor can be provided as one which is placeable at a narrower gap than in cases where the connection is implemented by lead wire or the like as in conventional strain sensors. Further, since the conductive interconnection line is formed of one band-shaped metal thin film, the conductive interconnection line can be fabricated with great ease.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

Figure 1:
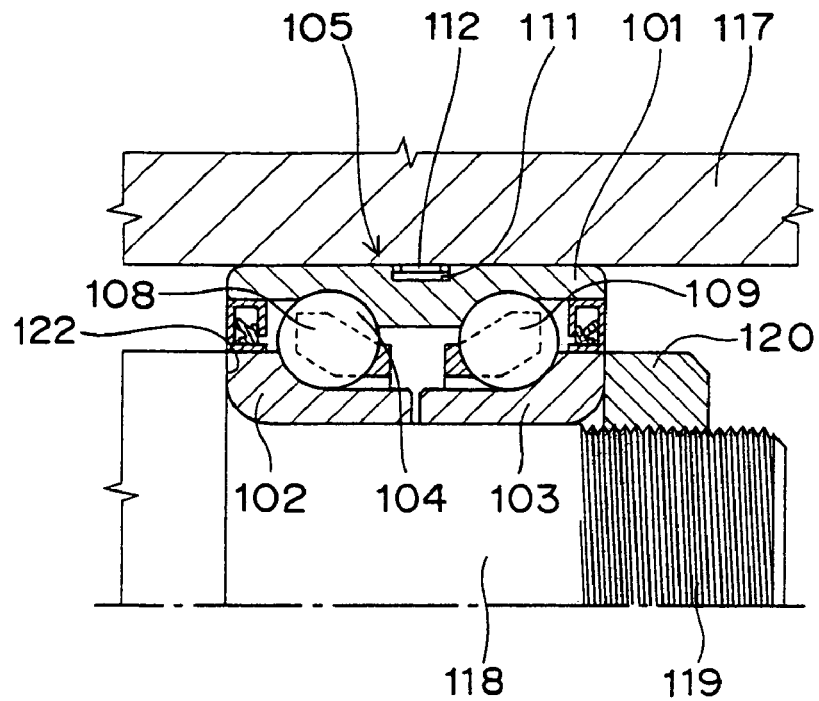
FIG. 1 is an axial sectional view of a double-row angular contact ball bearing device which is a first embodiment of the rolling bearing device with a sensor according to the present invention.

Hereinbelow, the present invention will be described in detail by way of embodiments thereof illustrated in the accompanying drawings. FIG. 1 is an axial sectional view of a double-row angular contact ball bearing device which is a first embodiment of the rolling bearing device with a sensor according to the present invention.

This double-row angular contact ball bearing device includes an outer ring 101, a first inner ring 102, a second inner ring 103, balls 104 serving as an example of the rolling element, and a sensor 105. The first inner ring 102 and the second inner ring 103 are spaced from each other in the axial direction of the outer ring 101.

The outer ring 101 has first raceway groove and second raceway groove as an example of the raceway surface on its inner periphery, while the first inner ring 102 and the second inner ring 103 have one raceway groove as an example of the raceway surface on its outer periphery. The outer ring is fixedly fitted to a housing 117, while the first inner ring 102 and the second inner ring 103 are fixedly fitted to a rotation shaft 118.

One end face of the first inner ring 102 on one side farther from the second inner ring 103 is in contact with a step portion 122 of the rotation shaft 118. Also, a screw 119 is formed on one side of the second inner ring 103 farther from the first inner ring 102 in the axial direction of the rotation shaft 118. A nut 120 is engaged with the screw 119. One axial end face of the nut 120 is in contact with one end face of the second inner ring 103 farther from the first inner ring 102. As the first and second inner rings 102, 103 are axially put in between the nut 120 and the step portion 122 by tightening the nut 120, a load is axially applied to the first and second inner rings 102, 103, by which a preload is imparted to the double-row angular contact ball bearing device.

The balls 104 are placed a plural number so as to be spaced from one another circumferentially with a regular spacing while they are held between the first raceway groove of the outer ring 101 and the raceway groove of the first inner ring 102 by a first ball-cage 108. Moreover, the balls 104 are placed a plural number so as to be spaced from one another circumferentially with a regular spacing while they are held between the second raceway groove of the outer ring 101 and the raceway groove of the second inner ring 103 by a second ball-cage 109.

The sensor 105 has a film 111, a foil 112, a microcomputer, and a monitor for receiving an output from the microcomputer and for displaying a result. The microcomputer serves both for the role as a resistance measurement section exemplifying the measurement section and for the role as a preload calculation section. It is noted that in FIG. 1, the film 111 and the foil 112 are depicted with exaggeration in terms of thickness for an easier understanding. The film 111 is made from a polyimide-based material having insulation property. The film 111 is band-shaped. The film 111 is affixed by adhesive at a portion of the outer circumferential surface of the outer ring 101 facing between the first inner ring 102 and the second inner ring 103 so as to extend circumferentially of the outer ring 101. On the film 111, the foil 112 is affixed by adhesive.

Figure 2:
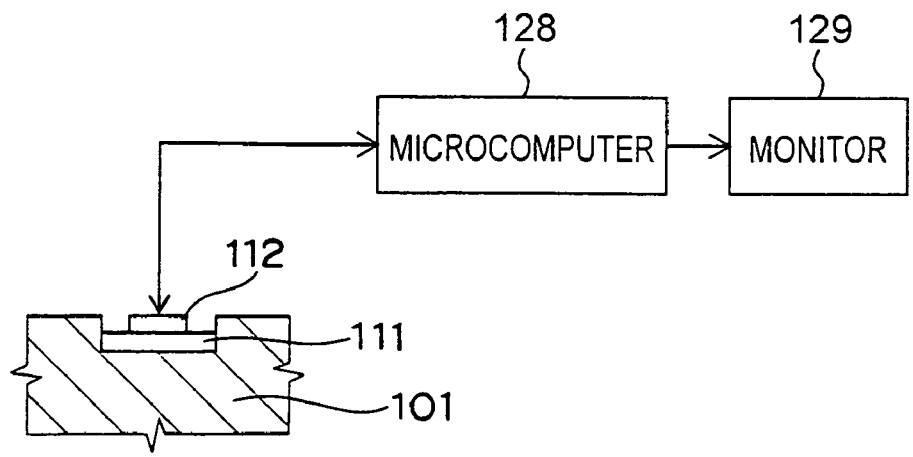
FIG. 2 is a view showing a microcomputer and a monitor included in the double-row angular contact ball bearing device of the first embodiment.

FIG. 2 is a view showing connection between the microcomputer 128 and the monitor 129 in the double-row angular contact ball bearing device of the first embodiment. In FIG. 2, the film 111 and the foil 112 are depicted with exaggeration in terms of thickness for an easier understanding.

As shown in FIG. 2, the foil 112 is electrically connected to the microcomputer 128. Also, the monitor 129 is electrically connected to the microcomputer 128. The microcomputer 128 applies a voltage to between a first place and a second place in the foil 112 to measure the resistance between the first place and the second place. Also, the microcomputer measures a strain of the foil 112 based on the obtained resistance (stress acting on the foil 112) to calculate a preload applied to the outer ring 101, which has a correlation with strain of the foil 112. The monitor 129 displays a preload calculated by the microcomputer 128.

In addition, since there is a correlation between a preload added to the outer ring 101 and a preload added to the rolling bearing device with a sensor, previously inputting this correlation into the memory of the microcomputer 128 makes it possible to calculate the preload applied to the rolling bearing device with a sensor by calculating the preload applied to the outer ring 101 (this also applies to cases where the film and the foil are affixed to the inner rings in other embodiments).

Figure 3:
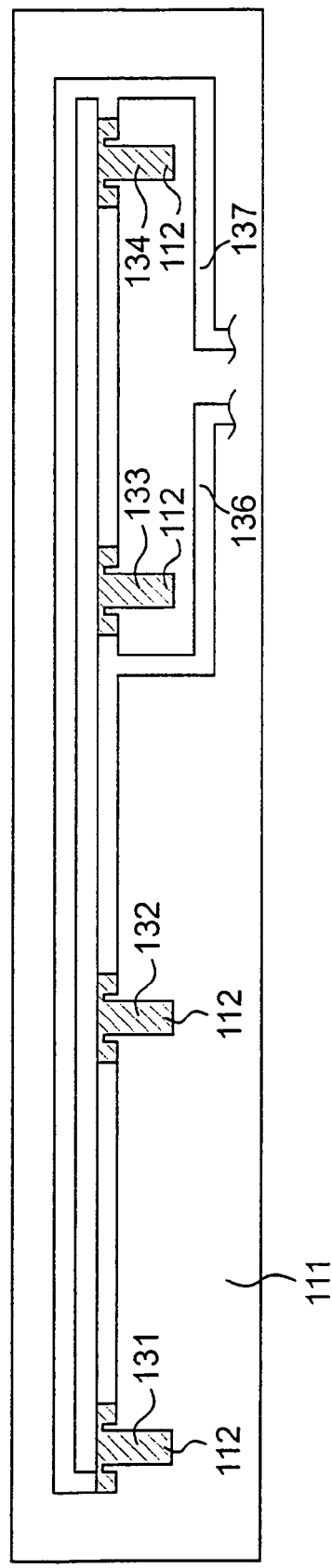
FIG. 3 is a view showing a layout of the foil on the film.

FIG. 3 is a view showing the film 111 and the foil 112 before being attached to the outer ring 101 and showing the layout of the foil 112 on the film 111.

As shown in FIG. 3, the film 111 is band-shaped. A longitudinal length of the film 111 is generally equal to a circumferential length of the outer circumferential surface of the outer ring 101 to which the film 111 is to be affixed. Also, the foil 112 is composed of generally identical four portions, i.e., a first portion 131, a second portion 132, a third portion 133 and a fourth portion 134. These four portions are laid out in a longitudinal direction of the film 111 at generally equal intervals in an order of the first portion 131, the second portion 132, the third portion 133 and the fourth portion 134 from one end of the film 111. With the film 111 affixed to the outer ring 101, the first portion 131, the second portion 132, the third portion 133 and the fourth portion 134 are laid out at generally equal intervals in the circumferential direction of the outer ring 101.

As shown in FIG. 3, each of the four portions has a form that two protrusions protrude from a rectangular-shaped portion. One protrusion of the first portion 131 and one protrusion of the second portion 132 are electrically connected to each other by an interconnection, while the other protrusion of the second portion 132 and one protrusion of the third portion 133 are electrically connected to each other by an interconnection. Also, the other protrusion of the third portion 133 and one protrusion of the fourth portion 134 are electrically connected to each other by an interconnection, while the other protrusion of the fourth portion 134 and the other protrusion of the first portion 131 are electrically connected to each other by an interconnection.

One end of the interconnection 136 is connected to a node between the other protrusion of the second portion 132 and the one protrusion of the third portion 133, while one end of the interconnection 137 is connected to a node between the other protrusion of the fourth portion 134 and the other protrusion of the first portion 131. The other end of the interconnection 136 is connected to connected to a first terminal of the microcomputer, which is not shown in FIG. 3, while the other end of the interconnection 137 is connected to a second terminal of the microcomputer.

The other protrusion of the second portion 132 and the one protrusion of the third portion 133 constitute the first place of the foil 112. Also, the other protrusion of the fourth portion 134 and the other protrusion of the first portion 131 constitute the second place of the foil 112.

The structure constructed of the film 111, the foil 112 and the interconnections shown in FIG. 3 is manufactured as shown below.

First, a film 111 and a foil 112 generally similar to the film 111 in surface configuration are prepared, and the foil 112 is affixed onto the film 111 by adhesive. The thickness of the foil is preferably 0.005 to 0.03 mm, and more preferably, 0.008 to 0.015 mm. Subsequently, portions in the foil 112 other than its first, second, third and fourth portions 131, 132, 133 and 134 are etched to manufacture a structure in which the first, second, third and fourth portions are laid out at equal intervals. Finally, wire material having such an electrical conductivity that its resistance is negligible is affixed onto the film 111 to form interconnections. In this way, the structure shown in FIG. 3 is manufactured.

Figure 4:
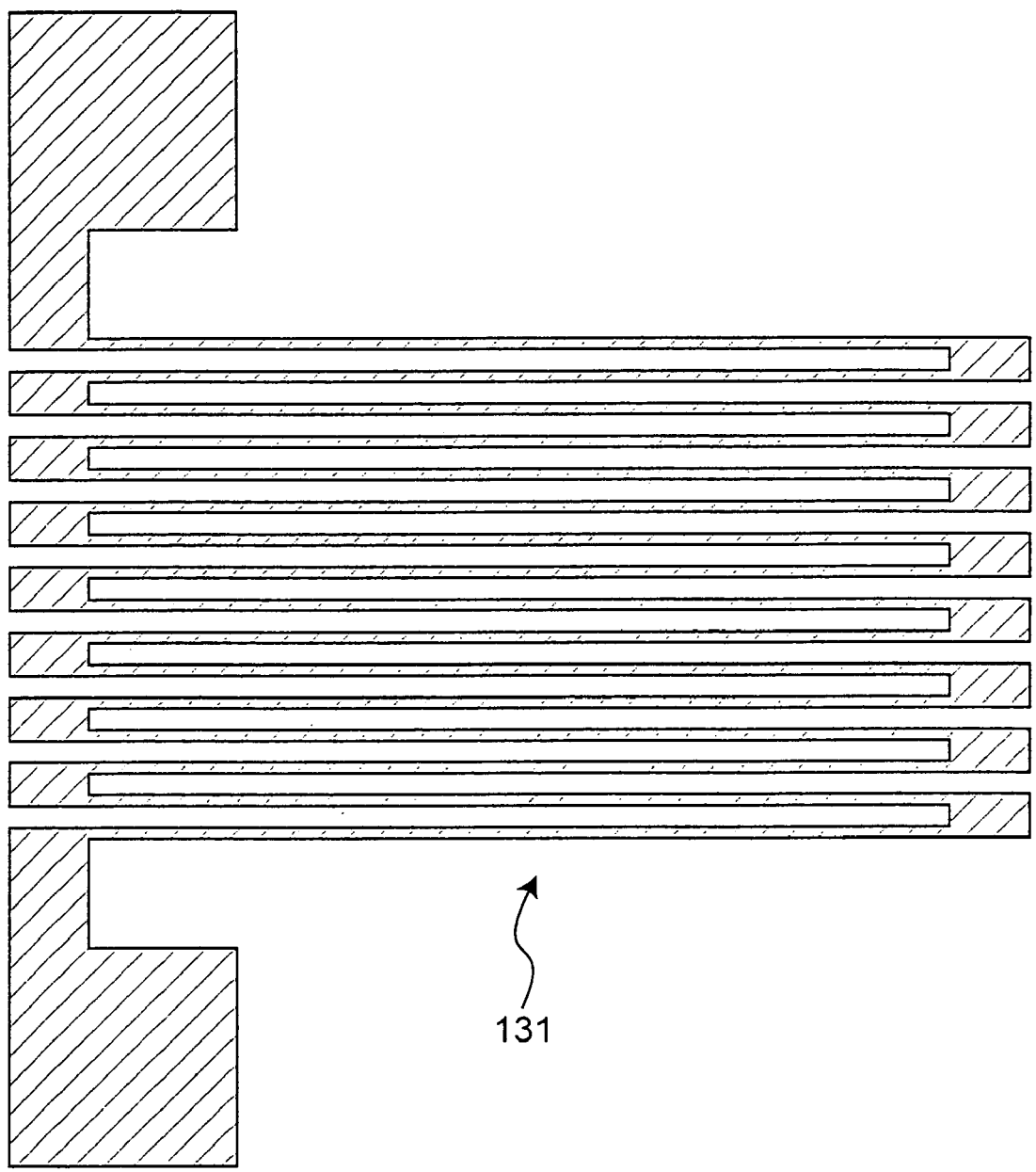
FIG. 4 is a view showing in detail the structure of a first portion of the foil.

FIG. 4 is a view showing in detail the structure of the first portion as described above. Although not explained, the second portion 132, the third portion 133 and the fourth portion 134 shown in FIG. 3 have the same structure as that of the first portion 131.

As shown in FIG. 4, the first portion 131 is so shaped that a linear portion and a bent portion which makes a 180° direction change are repeated alternately. In other words, the first portion 131 is so shaped that a plurality of S-shaped bands are coupled to one another, having a meandering-band shape. Linear portions other than the linear portions that form both ends of the meandering band are set equal in thickness and length to one another. Also, the linear portions forming both ends of the meandering band is thicker in width and longer in length, compared with the linear portions other than the linear portions forming the two ends. Interconnections are to be connected to the two ends of the band.

Figure 5:
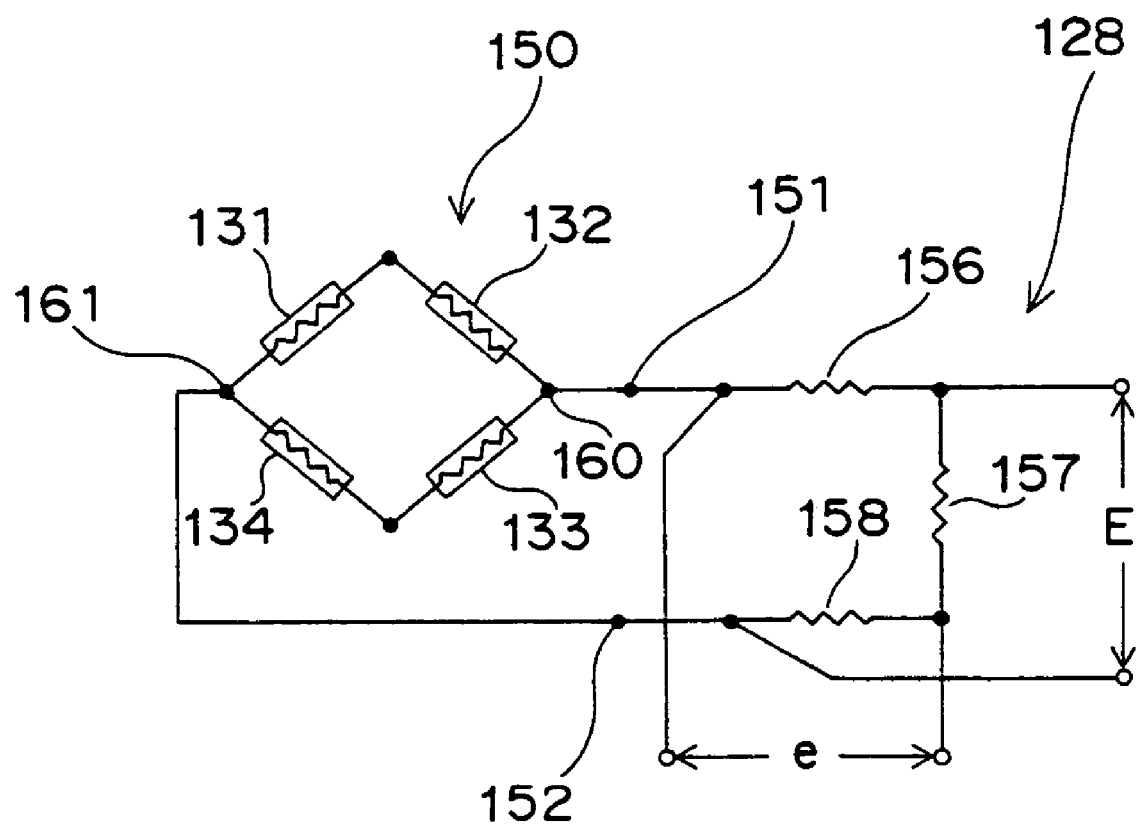
FIG. 5 is a view showing an equivalent circuit of the foil and the resistance measurement section of the microcomputer.

FIG. 5 is a view showing an equivalent circuit of the foil 112 and the resistance measurement section.

In FIG. 5, reference numeral 131 denotes the first portion of the foil 112, and 132 denotes the second portion of the foil 112. Further, 133 denotes the third portion of the foil 112, and 134 denotes the first portion of the foil 112. Also in FIG. 5, 151 denotes the first terminal of the microcomputer 128, and 152 denotes the second terminal of the microcomputer 128.

As shown in FIG. 5, a resistor 156, a resistor 157 and a resistor 158 contained in the microcomputer 128 are connected in series between the first place 160 of the foil 112 and the second place 161 of the foil 112.

The microcomputer 130 applies a voltage E between both ends of the structure composed of the series-connected resistor 157 and resistor 158 to measure a voltage e between both ends of the structure composed of the series-connected resistor 156 and resistor 157, thereby measuring a resistance between the first place 160 and the second place 161 of the foil 112.

In the first embodiment, as shown in FIG. 5, series-connected first portion 131 and second portion 132, and the series-connected third portion 133 and fourth portion 134, are connected in parallel. Therefore, an average resistance value of the resistance of the first portion 131, the resistance of the second portion 132, the resistance of the third portion 133 and the resistance of the fourth portion 134 can be measured, so that the preload acting on the outer ring 101 can be measured not locally but globally and accurately.

According to the rolling bearing device with a sensor of the foregoing first embodiment, since the insulative film 111 affixed to the surface of the outer ring 101, the conductive foil 112 mounted on the film 111, and the microcomputer 128 that measures the resistance between the first place 160 and the second place 161 of the foil 112 are included in the rolling bearing device, by measuring the resistance between the first place 160 and the second place 161 of the foil 112 by the microcomputer 128, it is possible to measure any strain of the foil 112, which has a correlation with the measured resistance, so that a preload imparted to the outer ring 101 can be measured based on the strain of the foil 112.

Also, according to the rolling bearing device with a sensor of the first embodiment, since portions of the sensor that are mounted to the outer ring 101 are the uniform-in-thickness and extremely thin film 111 and foil 112, the depth of the groove to be formed in the surface of the outer ring 101 can be made considerably shallower than the conventional counterpart, so that the groove machining cost can be reduced. Additionally, it is possible to measure the preload applied to the outer ring 101 only to affix the film 111 and the foil 112 to the shallower groove. Thus, the preload can be measured with relatively low cost.

Further, according to the rolling bearing device with a sensor of the first embodiment, since the portions of the sensor that are mounted on the outer ring 101 are the uniform-in-thickness, extremely thin and flexible film 111 and foil 112, the sensor can be easily affixed to the bent outer circumferential surface of the outer ring 101. Besides, it becomes possible to suppress the possibility that after the mounting of the sensor to the outer ring 101, the portions of the sensor mounted on the outer ring 101 may vary dependent on the configuration of portions of the outer ring 101 on which the sensor portions are mounted. Thus, there occur almost no errors in the mounting of the sensor, so that the level of preload measurement can be improved.

Further, according to the rolling bearing device with a sensor of the first embodiment, since the foil 112 has such a meandering band shape that its electrical characteristics are easily changed by strain, the strain of the outer ring 101 as well as the preload acting on the outer ring 101 can be measured precisely.

Also, according to the rolling bearing device with a sensor of the first embodiment, the foil 112 is composed of four portions that are of the same configuration, and these four portions are laid out on the outer circumference of the outer ring 101 at generally equal intervals circumferentially of the outer ring 101. Therefore, not local strain of the outer ring 101 but average strain of the whole outer ring 101 can be measured.

Further, according to the rolling bearing device with a sensor of the first embodiment, since the material of the film 111 is a polyimide-based one, a thin and highly insulative film 111 can be formed. Also, since the material of the foil 112 is nichrome, a foil 112 which is thin and which responses sensitively to strain and is capable of easily detecting variations in resistance can be formed.

Further, according to the rolling bearing device with a sensor of the first embodiment, since the preload calculation section for calculating a preload applied to the outer ring 101 based on an output from the measurement section of the microcomputer 128 is contained in the microcomputer 128, the preload applied to the outer ring 101 can be calculated.

In the foregoing rolling bearing device with a sensor of the first embodiment, after the foil 112 generally similar in configuration to the film 111 is affixed onto the film 111, excess portions of the foil 112 are etched to form the sensor. However, in the present invention, the sensor may be formed by affixing a foil, which has previously been formed into a specified configuration, onto the film.

Further, in the rolling bearing device with a sensor of the first embodiment, the film 111, which has been formed into a band shape, is affixed over the entire circumference of the outer ring 101. However, in the present invention, the film has only to be placed between the foil and a race (outer ring or inner ring) targeted for preload measurement, and does not necessarily need to be placed over the entire circumference of the race.

Further, in the rolling bearing device with a sensor of the first embodiment, a resistance between the first place 160 and the second place 161 of the foil 112 is measured and, based on this measurement, strain of the foil 112 is measured. However, in the present invention, with measurement of a current or voltage between the first place and the second place of the foil, strain of the foil may be measured based on the measured current or voltage.

Further, in the rolling bearing device with a sensor of the first embodiment, the series-connected first portion 131 and second portion 132, and the series-connected third portion 133 and fourth portion 134, are connected in parallel. However, in the present invention, with the foil composed of a plurality of portions, currents and voltages or resistances of the plurality of portions, respectively, may be measured each alone and then an average of resulting plural values may be calculated. In this case, of course, the foil has a plurality of first places and a plurality of second places.

Further, in the rolling bearing device with a sensor of the first embodiment, the foil 112 is composed of four portions discretely laid out on the outer ring 101. However, in the present invention, the foil may be composed of any plurality, other than four, of portions discretely laid out on the outer ring, or the foil may also be composed of one portion.

Further, in the rolling bearing device with a sensor of the first embodiment, the film 111 is formed from a polyimide-based material. However, in the present invention, the film may be formed from a material having insulation property other than polyimide-based materials, for example, polyester-based materials. Also, the foil may be formed from a material having electrical conductivity other than nichrome. For example, the material may be Ni, and Cu also will do if adjusted to an optimum cross-sectional area.

Further, in the rolling bearing device with a sensor of the first embodiment, the film 111 and the foil 112 are affixed to the outer ring 101. However, in the present invention, the film and the foil may also be affixed to the inner rings.

Further, in the first embodiment, a sensor having the film 111 and the foil 112 is mounted on a double-row angular contact ball bearing device. However, in the present invention, a sensor having a film and a foil, for example, may be mounted on a deep groove ball bearing, or roller bearings. That is to say, a sensor having a film and a foil may be mounted rolling bearings other than double-row angular contact ball bearings. In this way, a rolling bearing device with a sensor may be made up.

Figure 6:
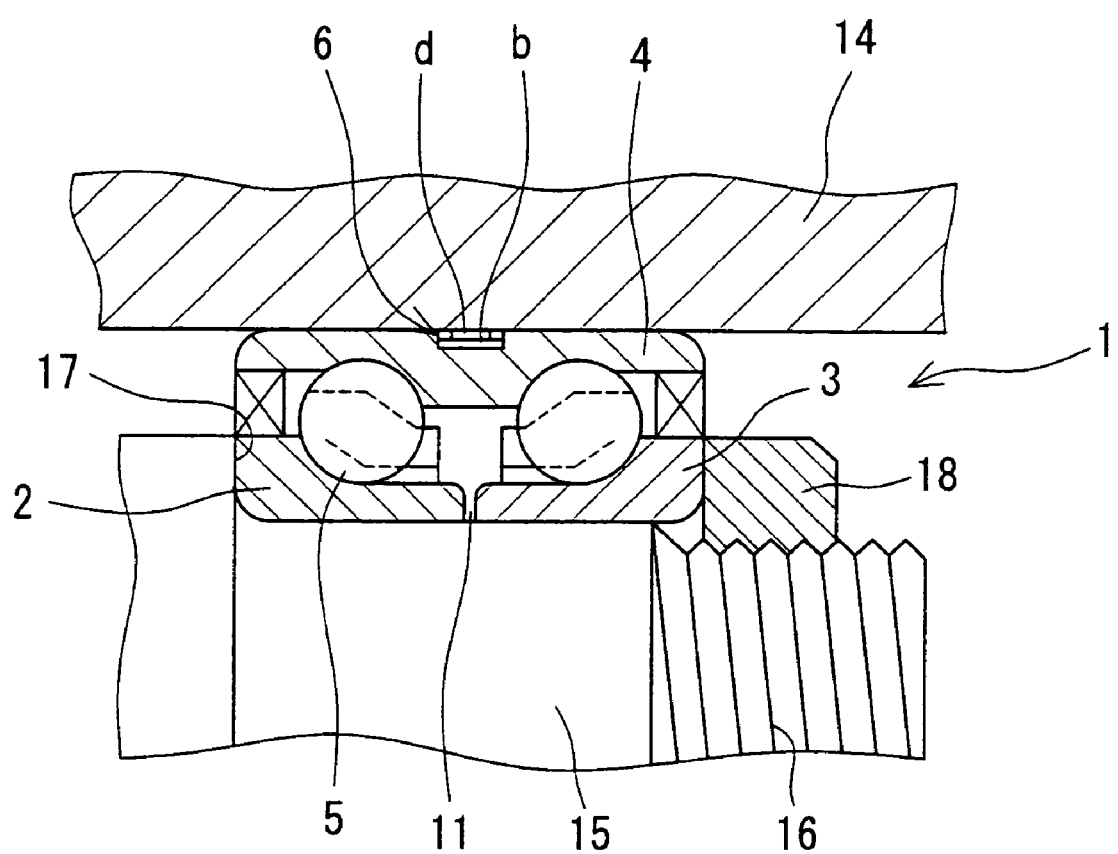
FIG. 6 is a sectional view of a double-row angular contact ball bearing device with a sensor which is a second embodiment of the present invention and of its peripheral members.

FIG. 6 is an axial sectional view of a double-row angular contact ball bearing device 1 which is a second embodiment of the rolling bearing device with a sensor according to the present invention and of its peripheral members.

The double-row angular contact ball bearing device 1 includes an outer ring 4 having a raceway surface on its inner circumference side, a first inner ring 2 and a second inner ring 3 each having a raceway surface on its outer circumference side, balls 5 serving as a rolling element, and a strain sensor 6. One of the two-row raceway grooves formed in the inner circumferential surface of the outer ring 4 faces the raceway surface of the first inner ring 2, and the other faces the raceway surface of the second inner ring 3. Then, the balls 5 are arranged between those facing raceway surfaces, respectively. The double-row angular contact ball bearing device 1 is a bearing device to be used for automobile wheels. That is, in a state that the bearing device 1 is mounted on an automobile as shown in FIG. 6, the inner rings 2, 3 are fixedly fitted to an axle 15, and the outer ring 4 is fixedly fitted to a knuckle 14. A screw portion 16 is provided at an axle end portion of the axle 15, and a nut 18 is tightened to the screw portion 16.

Figure 7:
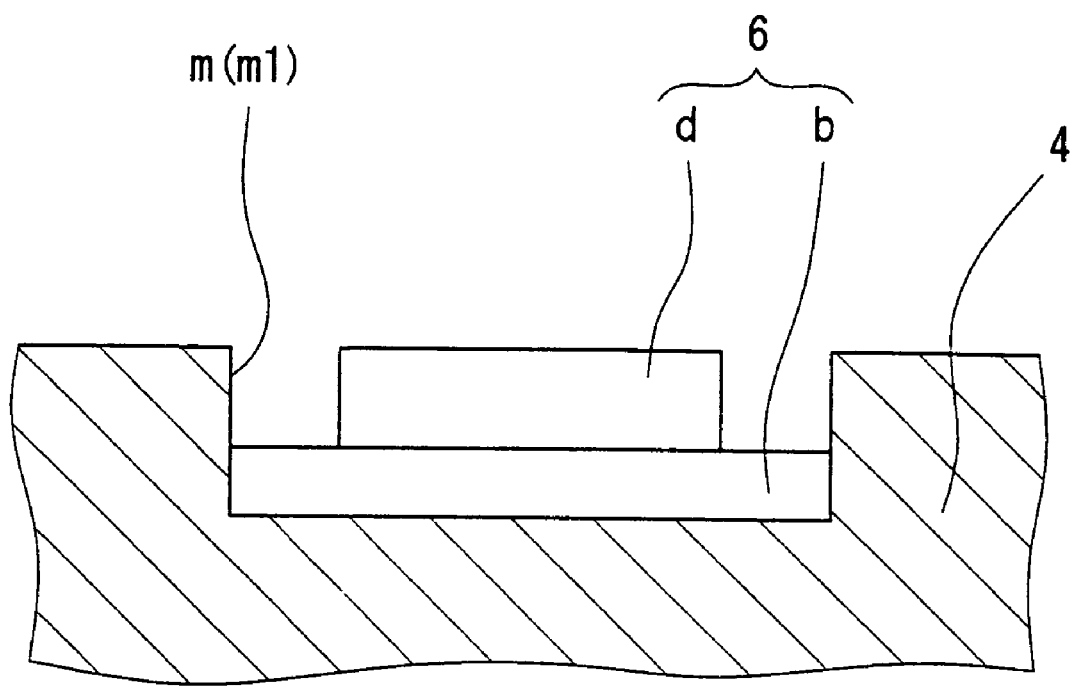
FIG. 7 is an enlarged sectional view of the strain sensor and a part of the outer ring adjacent to the strain sensor.

FIG. 7 is a sectional view showing a strain sensor 6 and the outer ring 4 in its vicinity. As shown in the figure, a groove m for housing the strain sensor 6 is provided on the outer circumferential surface of the outer ring 4. Because the depth of the groove m is set deeper than the thickness of the strain sensor 6, it never occurs that the strain sensor 6 is pinched between an external member (knuckle 14) and the outer ring 4 in such a placement state as shown in FIG. 6.

An end face in the outer side of the bearing of the first inner ring 2 is in contact with a step gap 17 provided in the axle 15. Also, an end face in the outer side of the bearing of the second inner ring 3 is in contact with the nut 18. Since an axial gap 11 is provided between the first inner ring 2 and the second inner ring 3, a preload can be imparted to the double-row angular contact ball bearing device 1 by pinching inner rings 2, 3 between the step gap 17 and the nut 18 by tightening the nut 18. Also, an axial load acting on the inner rings 2, 3 is changed by the tightening force of the nut 18, and the preload of the bearing device 1 is changed accordingly.

Figure 8:
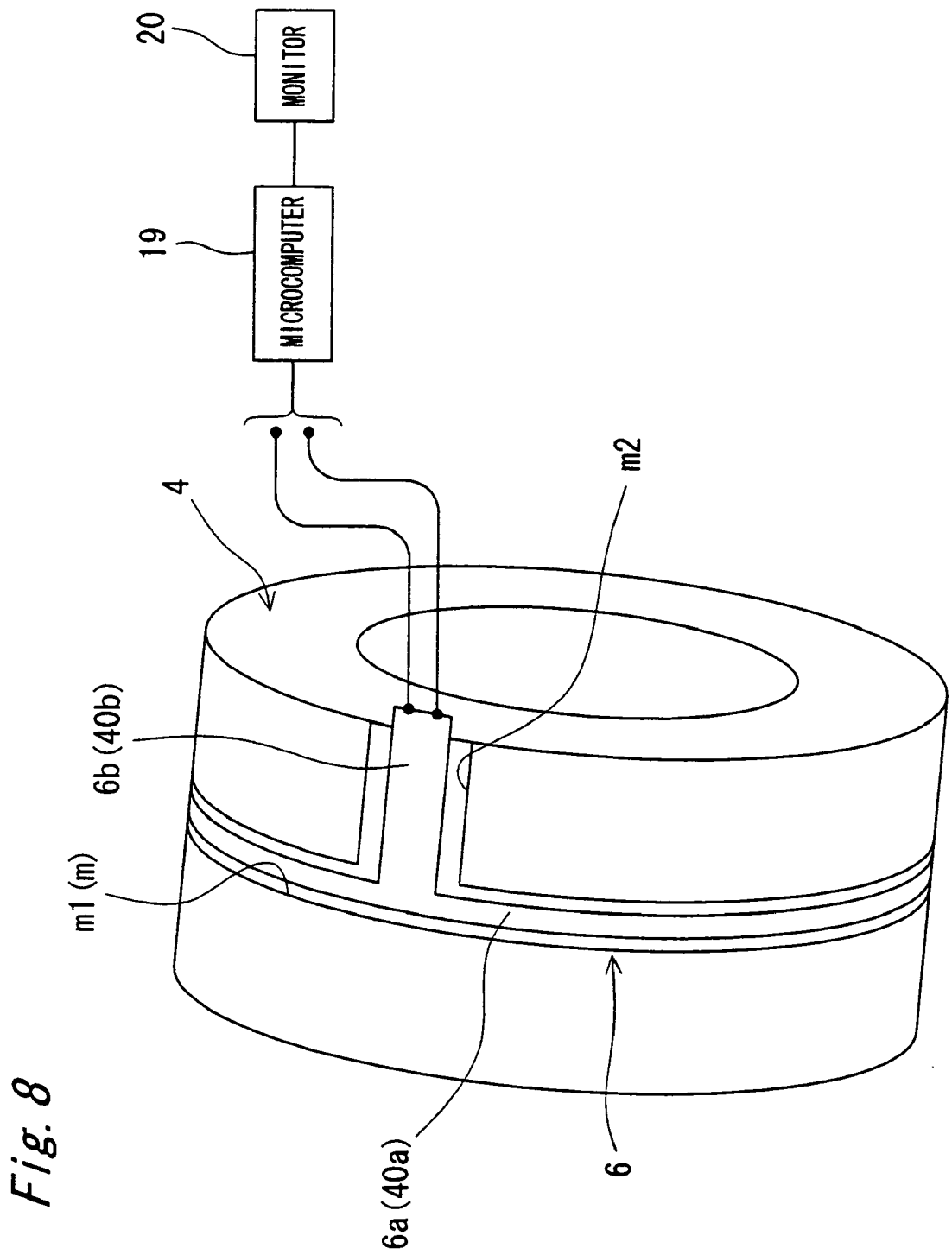
FIG. 8 is a perspective view of the outer ring and the strain sensor mounted on its outer circumferential surface.
Figure 9:
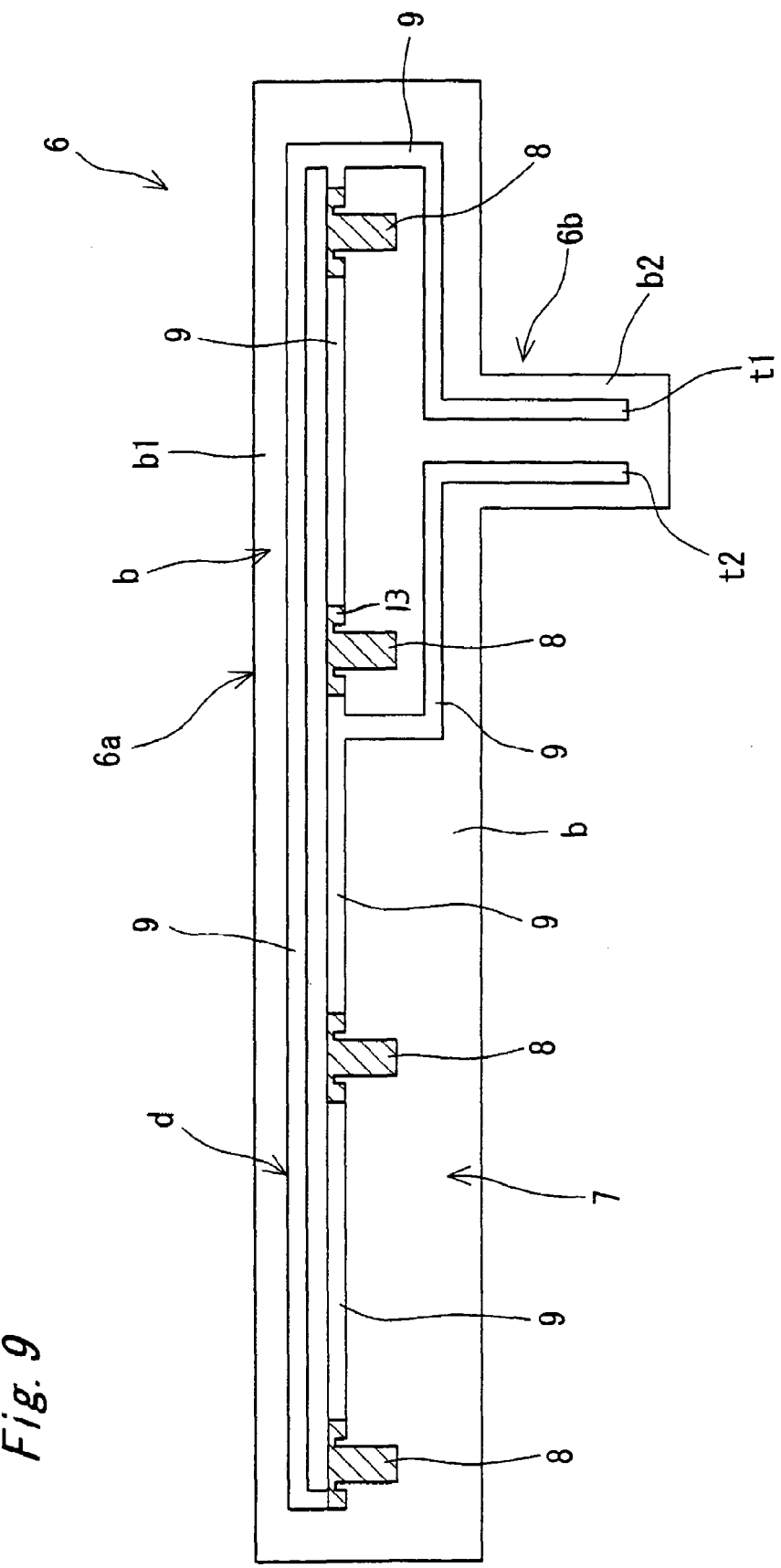
FIG. 9 is an overall view showing the strain sensor of the first embodiment.

FIG. 8 is a perspective view showing the outer ring 4 and the strain sensor 6 that is mounted so as to be wound on its outer circumferential surface. FIG. 9 is an overall view of the strain sensor 6. As shown in FIG. 9, the strain sensor 6 has a band-shaped portion 6a formed into a generally band shape, and a lead-out portion 6b extending along a direction generally perpendicular to the longitudinal direction of the band-shaped portion. Meanwhile, as shown in FIG. 8, the groove m for housing the strain sensor 6 has a circumferential groove m1 formed along the circumferential direction of the outer ring 4, and a take-out groove m2 which is formed in continuation to the circumferential groove m1 and which extends from the circumferential groove m1 to an end face of the bearing. The take-out groove m2 is provided along the axial direction. Then, the band-shaped portion 6a of the strain sensor 6 is placed within the circumferential groove m1, and the lead-out portion 6b is placed within the take-out groove m2. The lead-out portion 6b runs via the take-out groove m2, reaching the bearing outside. Therefore, even if the mounting surface of the strain sensor 6 (outer circumferential surface of the outer ring 4) is covered with any other member (knuckle 14) as shown in FIG. 6, a conductive interconnection d and external equipment can be connected to each other at the lead-out portion 6b.

The conductive interconnection d of the strain sensor 6 changes in its resistance, current or voltage in response to deformation (strain) of the outer ring 4. Therefore, any deformation of the outer ring 4 can be measured by the strain sensor 6, so that a preload acting on the bearing device 1 can be calculated based on a quantity of the deformation. In the second embodiment, one example where the resistance value of the conductive interconnection d is determined is explained. The strain sensor 6 is mounted at an axially central position of the outer ring 4 and this contributes to improvement of preload measurement accuracy. This is because the axially central position of the outer ring 4 is a regio where deformation due to the preload is more likely to occur.

The strain sensor 6 is connected to a monitor 20 via, for example, a microcomputer 19. The microcomputer 19 are contained a resistance measurement section capable of measuring a resistance value of the conductive interconnection d, a preload calculation section for calculating a preload acting on the bearing device 1 from the resulting resistance value, and an output section for displaying the calculated preload on the monitor 20. Therefore, by tightening the nut 18 under the confirmation of the preload displayed on the monitor 20, a predefined preload can be imparted to the bearing device 1 with high accuracy.

The strain sensor 6 will be explained in more detail below.

As shown in FIG. 7, the strain sensor 6 has an insulative film b, and a conductive interconnection d formed on the insulative film b. In FIGS. 6 and 7, the insulative film b and the conductive interconnection d are depicted with exaggeration in terms of thickness. It is noted that FIG. 7 is a schematic view showing a two-layer structure of the conductive interconnection d and the insulative film b, and accurate placement of the conductive interconnection d on the insulative film b is shown in FIG. 9.

As shown in FIG. 9, the insulative film b has a band-shaped insulating film portion b1, and an lead-out insulating film portion b2 which extends along a direction different from the longitudinal direction of the band-shaped insulating film portion b1. The direction in which the lead-out insulating film portion b2 extends is generally perpendicular to the longitudinal direction of the band-shaped insulating film portion b1. The band-shaped portion 6a of the strain sensor 6 is composed of the band-shaped insulating film portion b1 and the conductive interconnection d provided on the band-shaped insulating film portion b1. Also, the lead-out portion 6b of the strain sensor 6 is composed of the lead-out insulating film portion b2 and the conductive interconnection d formed on the lead-out insulating film portion b2. The lead-out portion 6b is provided one at a specified position along the longitudinal direction of the band-shaped portion 6a, and one end t1 and the other end t2 of the conductive interconnection d are placed on the lead-out portion 6b.

The conductive interconnection d has four high-resistance portions 8 on the way of its route. Each high-resistance portion 8 is formed of a metal thin film and serve as a strain gauge. Then, the conductive interconnection d has connecting portions 9 for connecting the four high-resistance portions 8, and the connecting portions 9 and the high-resistance portions 8 form a circuit in which the four high-resistance portions 8 are connected. More specifically, in this circuit, each two of the four high-resistance portions 8 are connected to one another in series, and moreover these pairs of series-connected high-resistance portions 8 are connected in parallel.

Not only the high-resistance portions 8 but also the connecting portions 9 are formed of a metal thin film. Therefore, the strain sensor 6 has no such interconnection portions of relatively large diameters as lead wires, thus being thinned over their entireties. Accordingly, the strain sensor 6 can be placed in a narrow gap and this contributes to suppression of depths of the circumferential groove m1 and the take-out groove m2.

Figure 10:
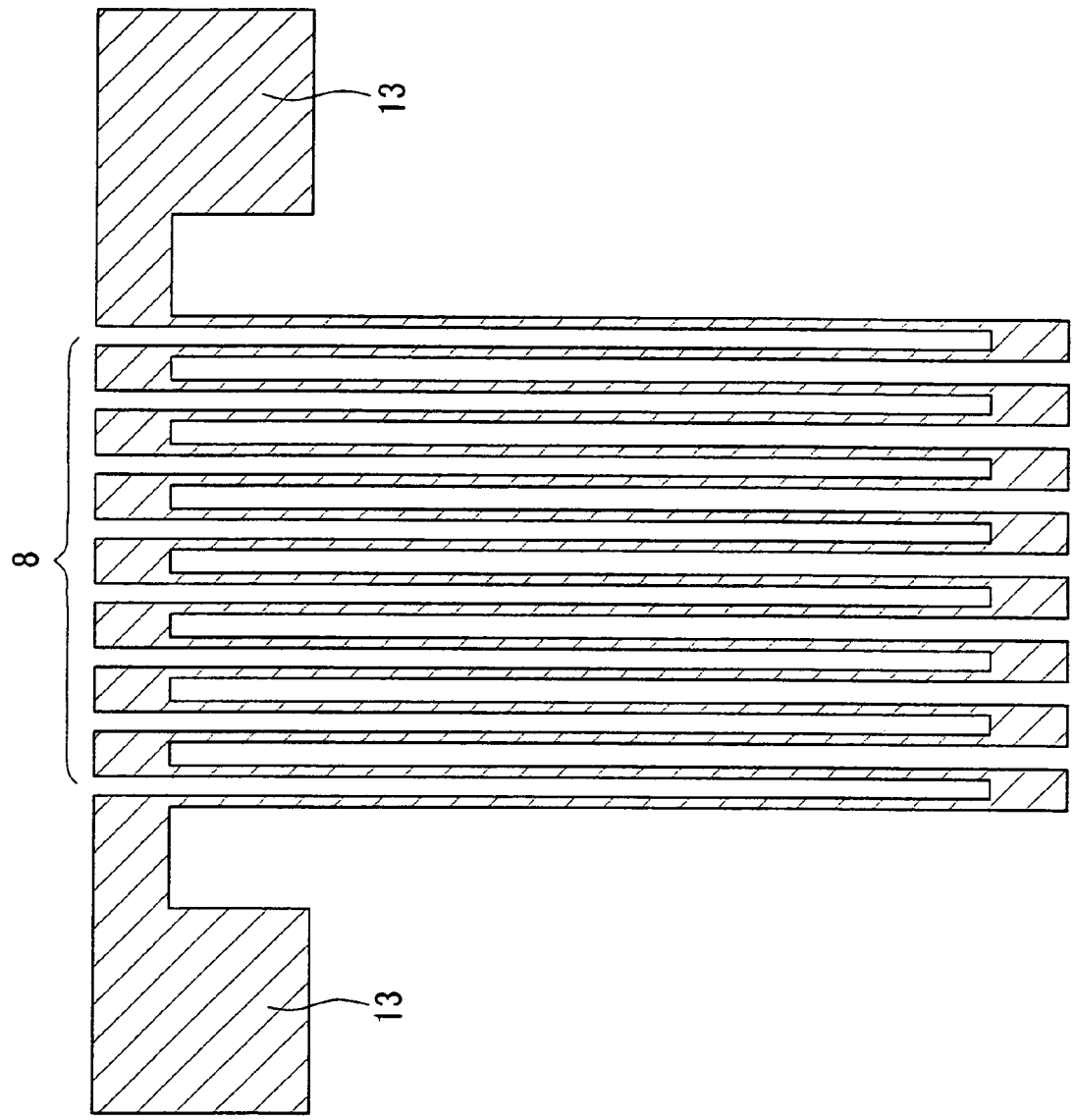
FIG. 10 is an enlarged view of a vicinity of high-resistance portions of the strain sensor of FIG. 9.

FIG. 10 is an enlarged view of a vicinity of the high-resistance portions 8. In FIG. 10, portions where the metal thin film is present are hatched for an easier understanding. As shown in FIG. 10, the high-resistance portions 8 are thin-line shaped and formed so as to be zigzagged. Therefore, the high-resistance portions 8 are thinned in their line width and elongated in line length and serves as strain gauges. Such high-resistance portions 8 are obtained by, for example, etching of a metal thin film. Also, joint portions 13 formed of the same metal thin film as that of the high-resistance portions 8 are provided at both ends of the high-resistance portions 8. As shown in FIG. 9, the joint portions 13 of different high-resistance portions 8 are connected to each other via the connecting portions 9.

The high-resistance portions 8 are disposed in a situation each longitudinal position for the strain sensor 6 is different. Then, as shown in FIG. 8, the strain sensor 6 is so placed on the outer circumferential surface of the outer ring 4 that the longitudinal direction of the strain sensor 6 is generally coincident with the circumferential direction of the outer circumferential surface of the outer ring 4. As a result, the high-resistance portions 8 are placed at a plurality of circumferential positions of the outer ring 4.

Further, in the strain sensor 6, the high-resistance portions 8 are placed at generally equal intervals with respect to the longitudinal direction of the strain sensor 6. As a result, with the strain sensor 6 fitted to the outer circumferential surface of the outer ring 4, the high-resistance portions 8 are laid out at generally equal intervals in the circumferential direction.

The metal from which the metal thin film of the high-resistance portions 8 is formed may be exemplified by nichrome, Ni, Cu or the like. This is applicable also to the metal thin film of the connecting portions 9. Also, the film forming the insulative film b may be exemplified by polyimide-based materials.

The double-row angular contact ball bearing device 1 or strain sensor 6 constructed as described above produces working effects shown below.

In the bearing device 1 described above, only fitting the single strain sensor 6 to the outer ring surface allows a plurality of high-resistance portions to be placed at a plurality of places on the race surface. Therefore, it is no longer necessary to do such troublesome work as preparing a plurality of commercially available strain gauges and affixing these gauges one by one to the race surface. Also, by virtue of the use of the strain sensor 6 in which a plurality of high-resistance portions 8 formed of metal thin film are formed on the insulative film, it becomes possible to reduce the cost for the strain sensor, as compared with cases where a plurality of commercially available strain gauges are used. Also, since the affixation of the strain sensor 6 allows the high-resistance portions 8 to be placed at a plurality of positions, a preload can be calculated by measuring deformation not only of one place but of a plurality of places. Therefore, the preload that acts on the race can be decided from data derived from a plurality of places, so that the measurement accuracy for preloads can be enhanced.

Further, only by setting the strain sensor 6 so that the longitudinal direction of the strain sensor 6 becomes generally coincident (in a winding fashion) with the circumferential direction of the circumferential surface of the race, the high-resistance portions 8 serving as strain gauges can be placed at a plurality of circumferential positions on the circumferential surface. Therefore, the preload that acts on the whole race can be decided comprehensively, so that the measurement accuracy for preloads can be even more enhanced.

By virtue of the presence of the circumferential groove m1 and the take-out groove m2, the strain sensor 6 is never pinched between the outer circumferential surface of the outer ring and the knuckle 14. Also, since the lead-out portion 6b reaches the bearing outside, the strain sensor and external equipment (microcomputer etc.) can be easily connected to each other by the lead-out portion 6b.

Further, since the high-resistance portions 8 are placed circumferentially at generally equal intervals, deformation data as to the race every equal interval in the circumferential direction are obtained, so that the preload that acts on the outer ring 4 can be totally grasped.

Figure 13:
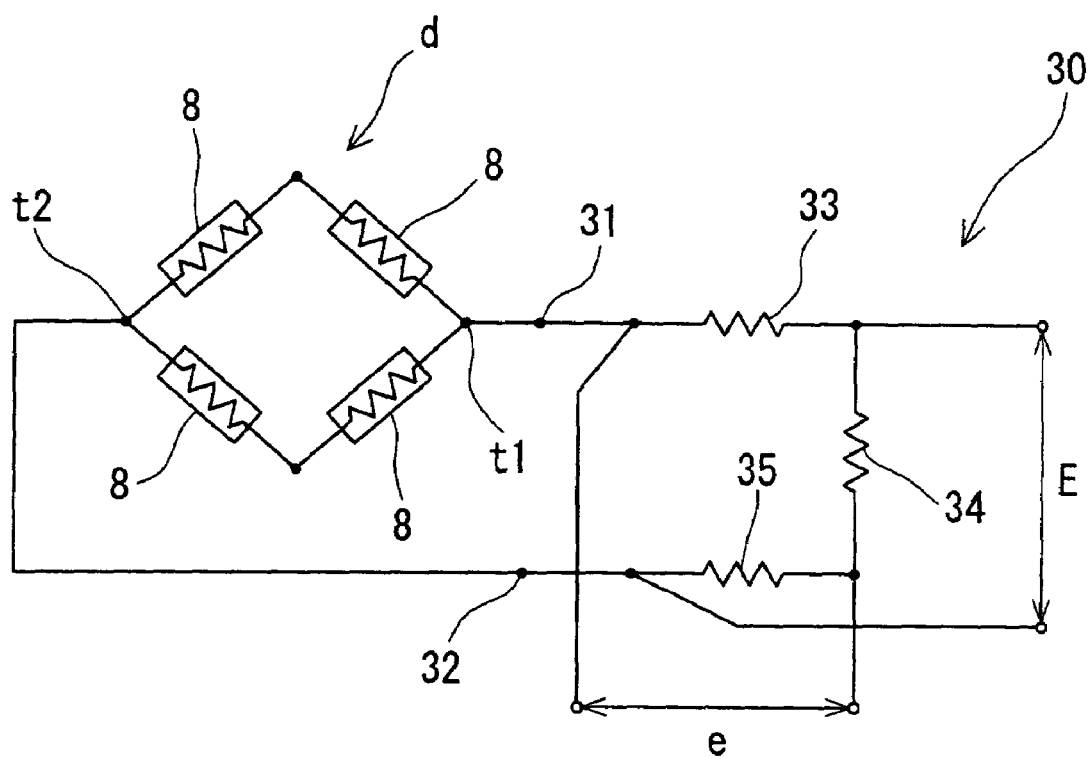
FIG. 13 is a circuit diagram in a state that a conductive interconnection and a resistance measurement section are connected to each other.

Now an example of the technique for determining a resistance value between one end t1 and the other end t2 of a conductive interconnection d in the strain sensor 6 is explained below. FIG. 13 is a circuit diagram in a state that the conductive interconnection d having four high-resistance portions 8 is connected to a resistance measurement section 30. A first terminal 31 of the resistance measurement section 30 and the one end t1 of the strain sensor 6 are connected to each other, while a second terminal 32 of the resistance measurement section 30 and the other end t2 of the strain sensor 6 are connected to each other. Then, A resistance value between the one end t1 and the other end t2 of the conductive interconnection d is measured by measuring a voltage e across the resistor 33 and the resistor 34 after a voltage E is applied to between a resistor 34 and a resistor 35 placed inside the resistance measurement section 30.

Figure 11:
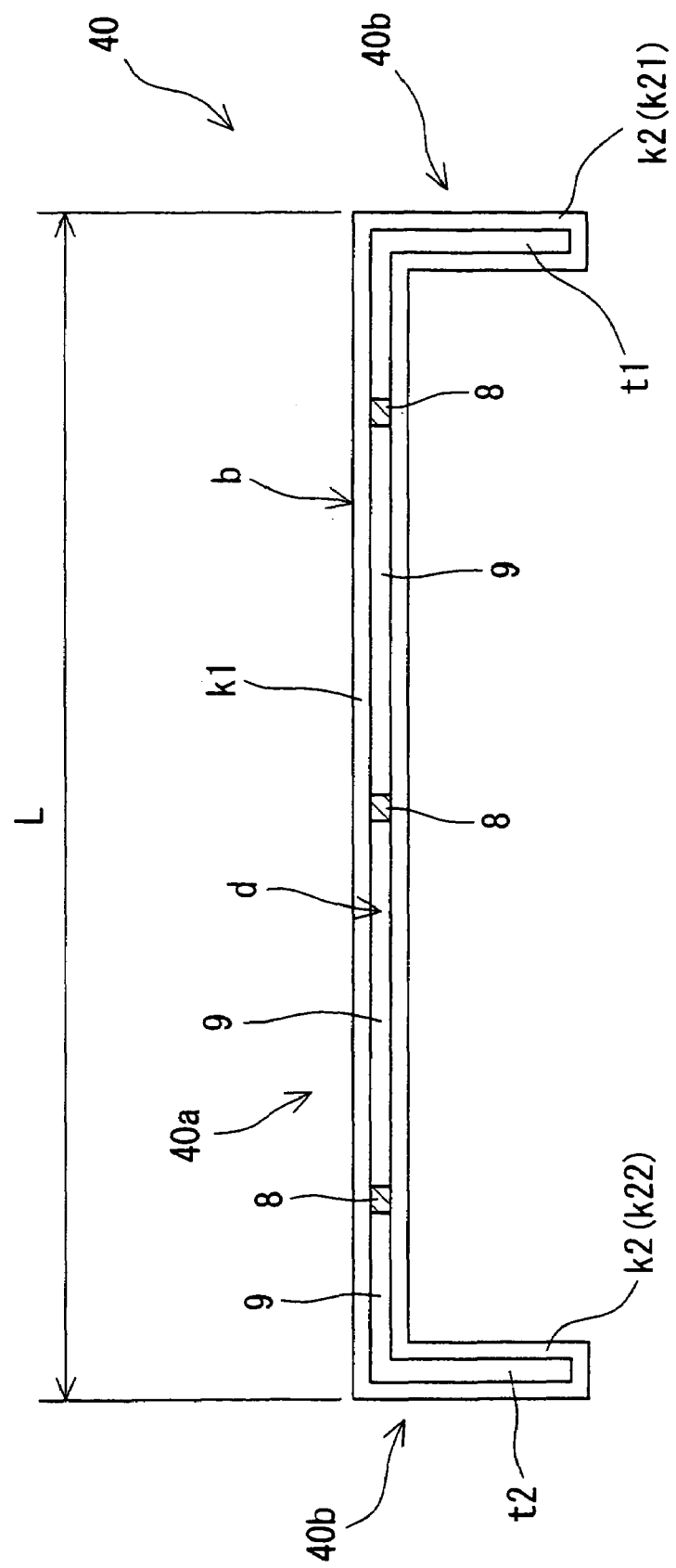
FIG. 11 is an overall view showing a strain sensor of the second embodiment.
Figure 12:
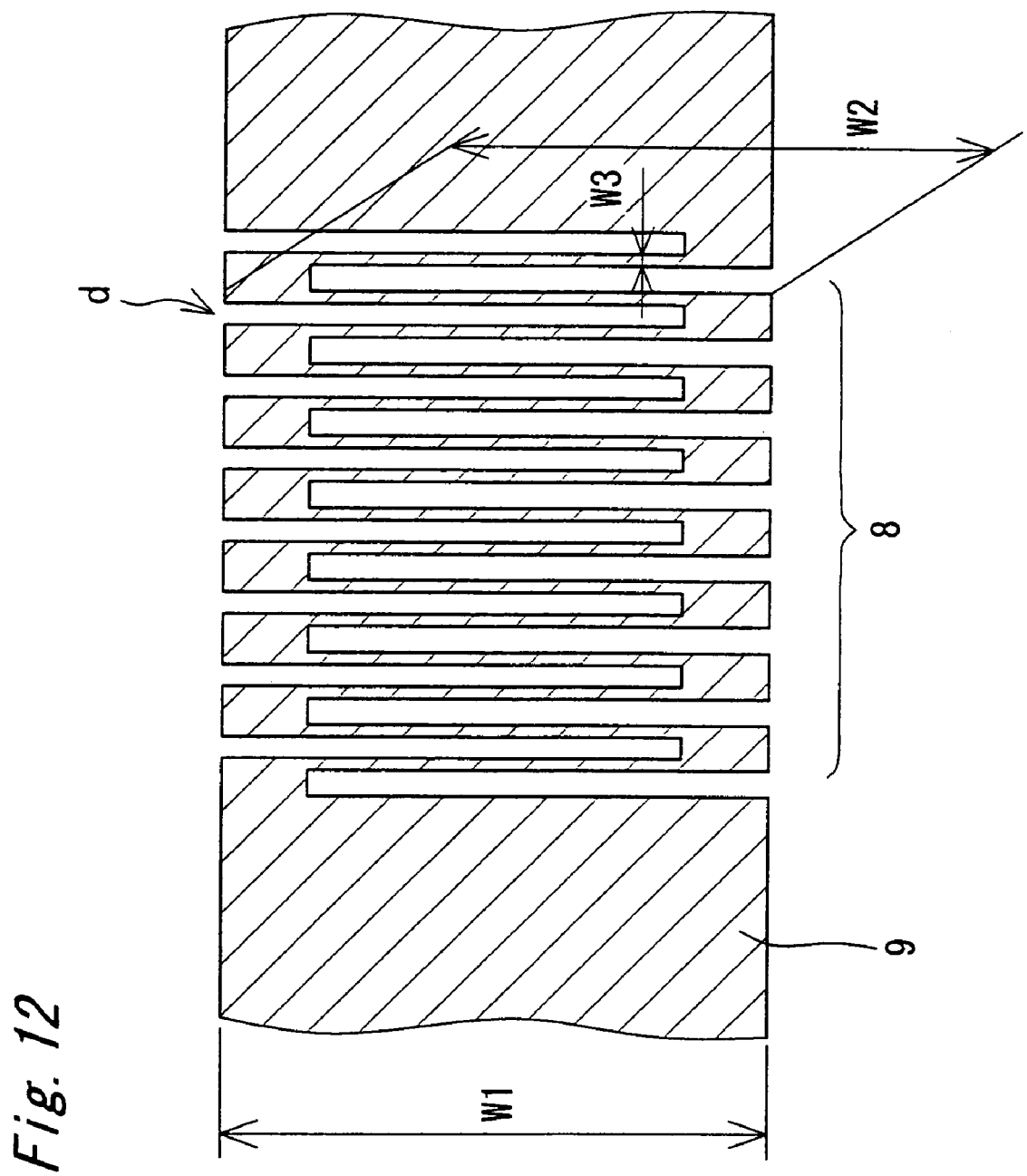
FIG. 12 is an enlarged view of a vicinity of high resistance portions in the strain sensor of FIG. 11.

FIG. 11 is an overall view showing a strain sensor 40 according to another embodiment of the invention. FIG. 12 is an enlarged view of a vicinity of high resistance portions 8 in the strain sensor 40. This strain sensor 40 is also mounted on the circumferential surface of the outer ring 4 to form part of a double-row angular contact ball bearing device. The description of the structure of this double-row angular contact ball bearing device is omitted below. It is noted that in FIG. 11, only the high-resistance portions 8 out of the conductive interconnection d are hatched for an easier understanding, while the connecting portions 9 are not hatched.

Unlike the strain sensor 6 shown in FIG. 9, the insulative film b of the strain sensor 40 has an intermediate portion k1 extending along its longitudinal direction, and two end portions k2 extending from both ends of the intermediate portion k1 in one direction generally perpendicular to the longitudinal direction of the insulative film b. Then, in the conductive interconnection d placed on the insulative film b, a plurality of high-resistance portions 8 and the connecting portions 9 that connect these high-resistance portions 8 to one another are formed of one band-shaped metal thin film. Also, the conductive interconnection d is placed on the surfaces of the intermediate portion k1 and two end portions k2 of the insulative film b along the direction in which these intermediate portion k1 and end portions k2 extend. One end t1 of the conductive interconnection d is placed on a first end portion k21, and the other end t2 of the conductive interconnection d is placed on a second end portion k22. The intermediate portion k1 and the conductive interconnection d on the intermediate portion k1 constitute a band-shaped 40a of the strain sensor 40. Besides, the two end portions k2 and the conductive interconnection d on the two end portions k2 constitute a lead-out portion 40b of the strain sensor 40.

The conductive interconnection d is simplified in circuit construction than in the strain sensor 6 of FIG. 9. That is, the conductive interconnection d of the strain sensor 40 is made up of series-connected three high-resistance portions 8. Therefore, the conductive interconnection d is in the state that the three high-resistance portions 8 and the connecting portions 9 serving for connecting those high-resistance portions to one another are connected together into a one-line shape.

The strain sensor 40 is fitted as shown in FIG. 8 in a mode similar to that of the strain sensor 6. That is, the intermediate portion k1 is placed within the circumferential groove m1, while the two end portions k2 reach the bearing outside through within the take-out groove m2. In this case, a longitudinal length L of the intermediate portion k1 is set generally equal to the perimeter of the circumferential surface (perimeter of the bottom face of the circumferential groove m1) of the outer ring 4. The strain sensor 40 wounding around the outer circumferential surface of the outer ring 4, as the longitudinal direction of the intermediate portion k1 is made coincident with the circumferential direction of the outer ring 4, the first end portion k21 and the second end portion k22 are placed so as to be proximate to each other. Therefore, these first end portion k21 and second end portion k22 can be placed at the single take-out groove m2. In this case also, since the one end t1 and the other end t2 of the conductive interconnection d are positioned proximate to each other, it becomes easier to connect these one end t1 and the other end t2 to external terminals.

In the strain sensor 40, the conductive interconnection d is formed of one band-shaped metal thin film. More specifically, the conductive interconnection d is formed of one band-shaped metal thin film having a specified width. Therefore, a width W1 of the connecting portions 9 is equal to a width W2 in a turn-back direction of the high-resistance portions 8.

Here is explained in detail a manufacturing method for the conductive interconnection d. One band-shaped (taped) metal foil is prepared, and longitudinal plural places (three places in the case of the strain sensor 40) of the metal foil are etched to form high-resistance portions 8. Now the etched portions serve as the high-resistance portions 8, and the other portions (non-etched portions) serve as the connecting portions 9. Then, by bending the two end portions of the etched metal foil, the conductive interconnection d as a whole is completed. By setting this conductive interconnection d onto the insulative film b, the strain sensor 40 is fabricated.

As shown above, in the conductive interconnection d of the strain sensor 40, the connecting portions 9 and the high-resistance portions 8 are integrally formed, time and labor for connecting a plurality of high-resistance portions 8 to one another by an interconnection is no longer necessary. Thus, a strain sensor 40 of extremely high productivity is provided. Also, in the strain sensor 40, since the conductive interconnection d is provided in a one-band form, the insulative film b can be made narrower in width, so that the strain sensor 40 itself becomes narrower in width and compact.

Further, the thickness of the conductive interconnection d (thickness of high-resistance portions 8 and connecting portions 9) can be set to, for example, about 0.01 mm, and the width W1 mentioned above can be set to about 5 mm. Also, a minimum line width W3 of the high-resistance portions 8 can be set to, for example, about 0.1 mm. However, these thicknesses and widths, as well as the number of turn-backs of the high-resistance portions 8 and the like are adjusted, as required, depending on the material properties of the conductive interconnection d and the like.

In the conductive interconnection d of the strain sensor 40, since three high-resistance portions 8 are connected in series, it is possible to measure a total value of the resistances of the three high-resistance portions 8 by measuring resistances across both ends t1, t2. Therefore, By mounting onto the outer ring 4 as shown in FIG. 8, deformations at the circumferential three places can be totally grasped, so that the preload acting on the outer ring 4 can be measured totally with high accuracy.

Although the metal thin film for making up the high-resistance portions 8 is formed of metal foil in the second embodiment, yet other techniques are also allowable. For instance, metal thin film may be formed by deposition such as CVD (Chemical Vapor deposition) or PVD (Physical Vapor Deposition). Also, the thin line pattern of the high-resistance portions 8 may be fabricated not only by the etching method described above but also by, for example, thermal transfer.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A rolling bearing device with a sensor comprising:
   an outer ring having a raceway surface on an inner circumference side thereof;
   an inner ring having a raceway surface on an outer circumference side thereof;
   rolling elements interposed between the raceway surface of the outer ring and the raceway surface of the inner ring; and
   a strain sensor mounted on a circumferential surface of the outer ring or a circumferential surface of the inner ring,
   the strain sensor having a conductive interconnection line having a plurality of thin-line shaped high-resistance portions made of metal thin film and being formed on an insulative film,
   the insulative film being formed in a band shape having a length generally equal to an entire circumferential length of the circumferential surface of the outer ring or the circumferential surface of the inner ring and wrapped around the circumferential surface of the outer ring or the circumferential surface of the inner ring,
   the conductive interconnection line being affixed to the insulative film, and
   the plurality of thin-lined shaped high-resistance portions are arranged substantially at even intervals circumferentially along an entire length of the insulative film.

2. The rolling bearing device with a sensor as claimed in claim 1, wherein
   the high-resistance portions are each disposed at a different longitudinal position along the strain sensor, and
   the strain sensor is placed on the circumferential surface of the outer ring or on the circumferential surface of the inner ring so that a longitudinal direction of the strain sensor is generally coincident with a circumferential direction of the circumferential surface.

3. The rolling bearing device with a sensor as claimed in claim 2, wherein
   the strain sensor has a band-shaped portion formed into a generally band shape, and a lead-out portion extending along a direction generally perpendicular to a longitudinal direction of the band-shaped portion, wherein
   the circumferential surface has a circumferential groove formed along the circumferential direction and a take-out groove being formed in continuation to the circumferential groove and extending from the circumferential groove to a bearing end face, and
   the band-shaped portion is placed within the circumferential groove, and the lead-out portion reaches an bearing outside via the take-out groove.

4. The rolling bearing device with a sensor as claimed in claim 2, wherein said high-resistance portions extend longitudinally in a direction approximately perpendicular to the longitudinal direction of the insulative film.

5. The rolling bearing device with a sensor as claimed in claim 1, wherein a longitudinal direction of the sensor approximately corresponds with the circumferential direction of the outer ring or the circumferential direction of the inner ring, respectively.

6. The rolling bearing device with a sensor as claimed in claim 1, wherein said high-resistance portions extend longitudinally in a direction approximately perpendicular to a longitudinal direction of the conductive interconnection line.

7. A rolling bearing device with a sensor comprising:
   an outer ring having a raceway surface on an inner circumference thereof;
   an inner ring having a raceway surface on an outer circumference thereof;
   rolling elements placed between the raceway surface of the outer ring and the raceway surface of the inner ring; and
   a sensor having (1) a film which is wrapped around and affixed onto a circumferential surface of the outer ring or a circumferential surface of the inner ring and which has insulation property, the film being formed in a band shape, and (2) a foil which is affixed onto the film so as to be integrated with the film, the foil having electrical conductivity,
   wherein the band shape film has a length generally equal to an entire circumferential length of the circumferential surface to which it is affixed.

8. The rolling bearing device with a sensor as claimed in claim 7, wherein the foil is composed of a plurality of identical thin-lined shaped high-resistance portions, each of which is affixed to the film, and
   the sensor has a measurement section for measuring a current, voltage or resistance between a first place and a second place of the foil, and
   the plurality of identical portions of the foil are arranged, spaced apart from each other substantially at even intervals circumferentially, along an entire length of the film.

9. The rolling bearing device with a sensor as claimed in claim 8, wherein
each of the discrete portions of the foil is meandering band-shaped.

10. The rolling bearing device with a sensor as claimed in claim 8, wherein
the film is affixed to the outer circumferential surface of the outer ring;
wherein the plurality of discrete portions of the foil are identical in configuration and are placed on the outer circumference of the outer ring at generally equal intervals on the film in a circumferential direction of the outer ring.

11. The rolling bearing device with a sensor as claimed in claim 8, further comprising:
a preload calculation section for calculating a preload which is imparted to the outer ring or the inner ring based on an output from the measurement section.

12. The rolling bearing device with a sensor as claimed in claim 7, wherein
material of the film is a polyimide-based material and material of the foil is nichrome.

13. The rolling bearing device with a sensor as claimed in claim 7, wherein a longitudinal direction of the sensor approximately corresponds with the circumferential direction of the outer ring or the circumferential direction of the inner ring, respectively.

* * * * *